United States Patent [19]

Bragdon et al.

[11] Patent Number: 4,744,990
[45] Date of Patent: May 17, 1988

[54] HYDANTOINS AS ANIMAL FOOD SUPPLEMENTS

[75] Inventors: Robert W. Bragdon, Nashua; Roger R. Gaudette, Hudson, both of N.H.

[73] Assignee: W. R. Grace & Co., Lexington, Mass.

[21] Appl. No.: 911,688

[22] Filed: Sep. 25, 1986

[51] Int. Cl.$^4$ .................................................. A01K 00/00
[52] U.S. Cl. ...................................... 426/2; 426/656; 426/807; 514/389
[58] Field of Search .......................... 426/2, 656, 807; 514/389

[56] References Cited

U.S. PATENT DOCUMENTS

| | | | |
|---|---|---|---|
| 3,644,629 | 2/1972 | Kolterman | 514/389 |
| 3,868,456 | 2/1975 | Faustini | 424/273 |
| 3,964,970 | 6/1976 | Dinelli et al. | 195/2 |
| 4,065,571 | 12/1977 | Bharucha et al. | 424/273 |
| 4,100,161 | 7/1978 | Walser | 424/274 |
| 4,100,293 | 7/1978 | Walser | 424/274 |
| 4,175,198 | 11/1979 | Gaudette | 548/308 |
| 4,228,099 | 10/1980 | Walser | 260/501.11 |
| 4,296,127 | 10/1981 | Walser | 424/319 |
| 4,320,146 | 3/1982 | Walser | 424/319 |
| 4,352,814 | 10/1982 | Walser | 424/273 |

FOREIGN PATENT DOCUMENTS

| | | | |
|---|---|---|---|
| 669828 | 9/1963 | Canada . | |
| 1965921 | 8/1971 | Fed. Rep. of Germany | 514/389 |
| 1965922 | 8/1971 | Fed. Rep. of Germany | 514/389 |
| 687562 | 8/1970 | South Africa . | |

OTHER PUBLICATIONS

Proc. Soc. Exp. Biol. Med. 85:409–411 (1954) "Substitution of α-Keto Acids for Five Amino Acids Essential for Growth of the Rat" New England Jour. Med., 290:663–667, 1974.
"The Use of Amino Acid Precursors in Nitrogen-Accumulation Diseases" Jour. Parenteral and Enteral Nutrition, 8(1), 37–4 "Rationale and Indications for the Use of α-Keto Analogues" (1983).
New Aspects of Clinical Nutrition, pp. 319–324 (Basel, 1983) "Nitrogen Sparing Effects of Branched Chain Ketoacids".
N.E. Jour. Med. 311(10), 623–629 "The Effect of Keto Acid–Amino Acid Supple. to a Restricted Diet on the Progression of Chronic Renal Failure" (1984) Wallaces Farmer (Jun. 14, 1986).
Pro Farmer (May 24, 1986).
ISU Press Release (May 19, 1986).
Bull. Soc. Chim. Fr. 1980 (1–2, Pt. 2) 91–95 (CA 92:176474).
J. Ferment Technol. 1978 56(5), 484–491 (CA 90:36129)
H. Yamada et al. Chem. Abst. 87:4028j vol. 87, p. 336 (Mitsugi et al., U.S. Pat. No. 4,016,037).
Fermentations 65026q vol. 73, 1970, p. 219 (Nakayama et al., 70,08633).
J. Biol. Chem (238(10), 3325–3329 (1963) H. Hassall et al.
J. Bacteriol. 81, 755–761 (1961) C. T. Gray et al.
Biochem. Biophys. Res. Commun. 5(4), 305–308 (1961) R. C. Valentine et al.

Primary Examiner—R. B. Penland
Attorney, Agent, or Firm—Bart G. Newland; Ronald A. Bleeker; William L. Baker

[57] ABSTRACT

Substituted hydantoin analogues of essential amino acids are used as nutritive supplements in animal feed compositions.

4 Claims, No Drawings

HYDANTOINS AS ANIMAL FOOD SUPPLEMENTS

BACKGROUND OF THE INVENTION

This invention relates to the field of animal nutrition. In particular, the invention concerns the addition of nutritive supplements to protein-containing animal feed compositions.

It is well known that animals require proteins for their growth and health. Proteins are used to replace tissues, generate hormones, to provide the structural framework of the body (e.g. muscles, tendons, cartilage, etc.) and can also be consumed for energy.

Amino acids are the building blocks of proteins. In all living organisms, proteins and their constituent amino acids are continuously metabolized and exist in a dynamic equilibrium in the cells. Approximately 20 amino acids are common constituents of animal proteins. However, eight to ten of these amino acids are essential for the animal's survival. Since the animal's reserves of these essential amino acids are normally depleted within a few hours, the animal must replenish its supply by ingesting proteins containing appropriate amounts of essential amino acids. The nutritional value of proteins used in animal feed is therefore a function of the presence of these essential amino acids in proper amounts. However, feeds containing proteins of low nutritional value, i.e. deficient in one or more essential amino acids, can be supplemented with those amino acids or with other proteins containing the needed amino acids in order to attain the proper balance and enhance the nutrient usability of the proteins. Thus, plant proteins such as wheat, corn, soybeans are commonly fortified with L-lysine, DL-methionine and/or other essential amino acids to upgrade the nutritional value of these common animal feeds.

It has been shown that the α-keto acid analogues of most of the essential amino acids can substitute for the corresponding amino acid in the diets of rats and men; see J. L. Wood and S. L. Cooley, *Proc. Soc. Exp. Biol. Med.* 85, 409–411 (1954), and J. H. Close, *N. Engl. J. Med.*, 290: 663–667 (1974). In 1973 Dr. MacKenzie Walser of Johns Hopkins University proposed using α-Keto acid analogues as non-nitrogen supplements to protein-reduced diets for kidney disease patients, who have difficulty eliminating nitrogen wastes. In the subsequent research, it was observed that the use of the keto analogues of the branched-chain essential amino acids leucine, isoleucine, and valine had a "protein-sparing" effect, i.e. use of these compounds prevented the body from using up amino acids in existing protein, thereby avoiding weight loss. The existing knowledge on the use of branched-chain α-keto acid analogues in humans was reviewed by Walser in *J. Parenteral and Enteral Nutrition*, 8(1), 37–41 (1983).

| AMINO ACID | α-KETO ACID ANALOGUE |
|---|---|
| R—CH—COOH<br>\|<br>NH₂ | R—C—COOH<br>\|\|<br>O |

Example:

R = (CH₃)₂CH (isopropyl group)

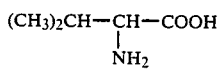

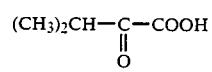

valine          α-keto-isovaleric acid

The work of Walser on the use of branched-chain keto acid analogues as a nutritional substitute in humans has recently been extended to the field of animal nutrition. Dr. Steven Nissen of Iowa State University has shown that the use of the keto analogue of leucine, α-keto-isocaproic acid (KIC), apparently has beneficial effects when used as a food supplement for livestock. *Wallaces Farmer* (June 14, 1986); *Pro Farmer* (May 24, 1986). Among the advantages claimed when KIC is substituted for most of the diet leucine are: (1) increased feed efficiency and growth, particularly in ruminants; (2) improved quality and production of milk; (3) reduced cholesterol, particularly in eggs and milk; (4) increased wool production in sheep; and (5) increased immunological response.

It should be noted that KIC has special properties which distinguish it from other branched-chain α-keto acid analogues. Although KIC is the metabolic precursor of leucine, the two compounds have different metabolic fates in animals. KIC is absorbed mostly in the gut and utilized mostly in the liver. Leucine is absorbed mostly in the stomach and is metabolized in muscle tissue. KIC is also involved in steroid and carbohydrate metabolism.

"The use of α-keto acid analogues as animal feed supplements possesses certain disadvantages. For example, the essential amino acid L-lysine is used as a commodity feed supplement. However, the direct keto analogue of this amino acid is non-nutritional. Another problem is that KIC is degraded substantially by the rumen and thus has to be protected by coating or additives if used with ruminants."

In addition, the branched-chain α-keto acid analogues corresponding to the essential amino acids leucine, isoleucine, and valine are unstable liquids or low-melting solids with vary unpleasant odors. The calcium or sodium salts of the branched-chain α-keto acid analogues are the forms most commonly used as nutritive supplements. Although these salts have been shown to have the beneficial nutritive properties discussed above, they have several drawbacks: (1) bad taste; (2) unpleasant odor; (3) limited stability; and (4) degradation in the rumen. For humans, the bad taste is particularly problematic since it is difficult to mask. Walser has overcome this problem in some of his patents by forming the L-lysine, L-ornithine, and/or L-histidine salts of the branched-chain α-keto acid analogues. However, these salts are much more costly than simple metal salts. The unpleasant odor of branched-chain keto acid analogue salts, especially when contacted with the skin or other moist environment, makes branched-chain α-keto acid analogues' use objectionable to those who handle and administer the supplements.

It is the object of this invention to provide nutritional supplements for animal feeds which do not have the foregoing disadvantages of branched-chain keto acid analogues. It is "believed that the 5-alkylidene and 5-hydroxy-5-alkyl substituted hydantoin analogues of the " essential amino acids can serve such a purpose.

5-Substituted hydantoins are common chemical intermediates in the manufacture of branched-chain keto acid analogues. See, e.g., U.S. Pat Nos. 4,069,251. They have the same carbon structure as the branched-chain keto acid analogues. However, these hydantoins are very stable powders with little odor or taste. In addition, these precursors obviously have a lower cost than the keto acid final products. The low water solubility and stability of the hydantoins should also allow them to survive the rumen better than unprotected branched-chain keto acid analogues.

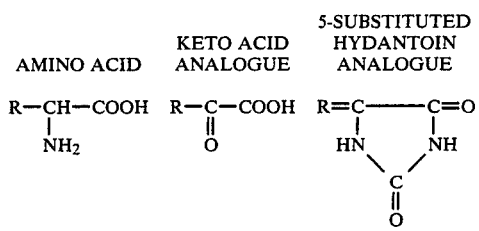

Example:

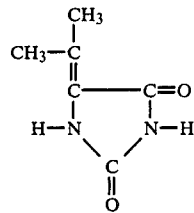

"The present invention is directed to the use of 5-alkylidene and 5-hydroxy-5-alkyl substituted hydantoins as nutritive supplements in animal feed. As far as is known to applicants, these classes of hydantoin analogues of essential amino acids have never previously been tested or used for such purpose. However, it should be noted that 5-(2-methylthioethyl)-hydantoin, the hydantoin analogue of the essential amino acid DL-methionine, has been used as an animal feed supplement to improve feed efficiency. See U.S. Pat. No. 3,644,629. Thiohydantoins (i.e. a hydantoin-type structure containing a sulfur atom as part of the ring structure) have also been used as animal feed additives to regulate metabolism and increase the conversion ratio of nutrients, South African No. 68/7562."

5-isopropylidene-hydantoin

The carbon structure of the hydantoins which are the subject of this invention is stabilized through cyclization with a urea moiety. Enzymes called hydantoinases exist in nature that cleave urea from hydantoin rings to yield α-keto acids and amino acids. See M. Guivarch et al, *Bull Soc. Chim. Fr.* 1980 (1-2, Pt.2) 91-95 (CA 92: 176474); H. Yamada et al, *J. Ferment. Technol.* 1978 56(5), 484-91 (CA 90: 36129); U.S. Pat. No. 4,016,037; Japanese Pat. No. 70 08,633 (CA 73: 65026); H. Hasall and D. M. Greensberg, *J. Biol. Chem.* 238(10), 3325-2239 (1963); C. T. Gray et al, *J. Bacteriol.* 81, 755-61 (1961) (CA 55: 20088); R. C. Valentine and R. S. Wolfe, *Biochem. Biophys. Res. Commun.* 5(4), 305-308 (1961). Hydantoins are generally metabolized in the liver via pyrimidine pathways. Thus, dihydropyramidinase extracted from calf liver has been shown to act as a hydantoinase; see U.S. Pat. No. 3,964,970.

SUMMARY OF THE INVENTION

The present invention is directed to the use of substituted hydantoin analogues of essential amino acids as a new class of nutritive supplements for protein-containing animal feed compositions. Certain embodiments of this invention are believed applicable to the attainment of particular beneficial effects and the treatment of certain disorders in animals.

The specific compositions employed in the practice of the present invention comprise substituted hydantoin analogues of the essential amino acids L-valine, L-leucine, and L-isoleucine. Ingestion of these hydantoin analogues acts as a substitute for the ingestion of the analogous required essential amino acids. However, since the hydantoin analogues are absorbed and metabolized differently from the corresponding amino acids while still providing α-keto acids and amino acids for protein synthesis, special metabolic effects are obtained which can be highly desirable and/or therapeutic.

As protein supplements, the present invention is directed to food compositions containing an admixture of food proteins and hydantoin analogues and the use of hydantoin analogues as food supplements to insure proper animal nutrition, promote protein sparing, and/or treat renal and liver disease. The present invention is also directed at the use of a hydantoin analogue supplement corresponding to leucine to lower serum, meat, milk, and egg yolk cholesterol; increase feed efficiency and growth; and enhance disease resistance.

DETAILED DESCRIPTION OF THE INVENTION

The present invention is directed to the use of substituted hydantoin analogues of essential amino acids as nutritive supplements for animal feed compositions. In particular, the invention comprises the use of the following hydantoin analogues:

TABLE I

| Essential Amino Acid | Hydantoin Analogue | |
|---|---|---|
| L-valine | 5-isopropylidene-hydantoin, or 5-hydroxy-5-isopropyl-hydantoin | (VH) |
| L-isoleucine | 5-sec-butylidene-hydantoin, or 5-hydroxy-5-sec-butyl-hydantoin | (IH) |
| L-leucine | 5-isobutylidene-hydantoin, or 5-hydroxy-5-isobutyl-hydantoin | (LH) |
| DL-methionine | DL-5-(2-methylthio-ethyl)-hydantoin | (MH) |

Instead of the corresponding α-keto acid or amino acid, the hydantoin analogues can be used to fortify low quality protein feeds to provide a balanced food, or else can be used in special, therapeutic diets that provide the minimum required protein. The hydantoin analogues should be in an edible, nutrionally absorbable form, such as the free acid or its sodium, potassium, or calcium salt. VH, IH, and LH are the precursors in the manufacture of the α-keto acid analogues of, respectively, valine, isoleucine, and leucine. Both 5-alkylidene-hydantoins and 5-hydroxy-5-alkyl-hydantoins yield the α-keto acids upon hydrolysis. MH is the intermediate in the manufacture of DL-methionine. Consequently, the hydantoin analogues are less costly than the corresponding α-keto acid analogues.

When used to fortify a protein-containing feed composition, each of the foregoing hydantoin analogues can be orally administered in amounts ranging from 1 to 1000 milligrams (mg) per kilogram (kg) of body weight per day, the actual amount depending on the type of animal and the protein being fortified. More typically, the range is 10 to 500 mg/kg body weight/day when supplementing food that is 10 to 24% protein. These ranges correspond to 0.01-6.0 weight % of each added hydantoin analogue, or preferably 0.5-1.5% of each for large animals, such as ruminants, and 0.05-0.5% of each for smaller animals, such as poultry.

In another embodiment of the invention, the branched-chain hydantoin analogues VH, IH, and LH can be substituted for the corresponding essential amino acids or α-keto acids in the diet. The effect of these hydantoin acids is similar to that produced by the branched chain keto acid analogues—protein sparing. A minimal, mixed-quality protein diet (about 400 mg. protein/kg. body weight/day, which corresponds to about 5% protein) balanced with the needed amino acids and 25 to 400 mg. of each hydantoin analogue/kg body weight/day, preferably 50 to 200 mg., substituted for the branched-chain keto acid analogues, can sustain growth, produce protein sparing, and other beneficial metabolic effects. Such diets are known to be useful for treating wasting diseases, such as malnutrition and kidney and liver disease, particularly in humans.

LH itself can be substituted for leucine in the diet at dosages indicated above, but preferably to produce effects similar to those known to KIC. Such beneficial effects (beside protein-sparing) include increased growth and feed efficiency; lowered serum, meat, milk, and egg yolk cholesterol; increased milk production; increased wool production; and enhanced disease resistance.

We claim:

1. In the method of feeding protein-containing food materials to warm-blooded animals, the improvement which comprises orally administering to said animals an admixture of protein-containing food materials with 0.01 to 6.0 weight percent of one or more of the 5-substituted hydantoin analogues of valine, isoleucine or leucine.

2. The method of claim 1 in which the substituted hydantoin analogues are selected from the following group:
   (a) 5-isopropylidene-hydantoin
   (b) 5-hydroxy-5-isopropyl-hydantoin
   (c) 5-isobutylidene-hydantoin
   (d) 5-hydroxy-5-isobutyl-hydantoin
   (e) 5-sec-butylidene-hydantoin
   (f) 5-hydroxy-5-sec-butyl-hydantoin.

3. The method of claims 1 or 2 in which the substituted hydantoin analogues are provided in the form of their sodium, potassium, or calcium salt.

4. The methods of claims 1 or 2 in which the food materials comprise 5-25% protein on a dry weight basis and 0.5 to 1.5 weight percent of one or more of the admixed substituted hydantoin analogues.

* * * * *

UNITED STATES PATENT AND TRADEMARK OFFICE
CERTIFICATE OF CORRECTION

PATENT NO. : 4,744,990

DATED : May 17, 1988

INVENTOR(S) : Robert W. Bragdon, et al

It is certified that error appears in the above-identified patent and that said Letters Patent is hereby corrected as shown below:

Claim 1, line 5, insert --5-alkylidene or 5-hydroxy-5-alkyl-- after "one or more of the."

Claim 1, lines 5-6, delete "5-substituted" and substitute therefore --substituted--.

Signed and Sealed this

Fifth Day of December, 1989

Attest:

JEFFREY M. SAMUELS

Attesting Officer　　Acting Commissioner of Patents and Trademarks